Patented June 8, 1937

2,083,007

UNITED STATES PATENT OFFICE 2,083,007

POTTING COMPOSITION

Myron E. Delaney, Summit, N. J., assignor to Halowax Corporation, New York, N. Y., a corporation of Delaware No Drawing. Application March 6, 1929, Serial No. 344,921. Renewed August 23, 1932

5 Claims. (Cl. 106—8)

This invention relates to compositions used for filling interstices and embedding or covering objects, such as fixed electrical condensers, dry batteries, etc., inserted in metal or other receptacles; such compositions are usually referred to as potting compositions.

As heretofore supplied, potting compositions have comprised mixture including sealing wax and similar resinous substances. As indicative of their properties, a commonly employed composition, when tested, showed a flow point of 63° C. (determined by the ball and ring method) and a viscosity varying from 400 at 120° C. to about 225 at 130° C. (according to the Stormer method, in which is noted the number of seconds for a cylinder immersed in the molten material to make a hundred revolutions caused by the gravity pull of a 100 gram weight). However, high viscosities are undesirable as there is a tendency to congeal and form air pockets. Furthermore, it is desirable that the flow point of the composition be higher than any temperature likely to be encountered so that the objects will remain firmly embedded and in place within the receptacle. In addition it is a practical requirement that the compositions do not shrink upon cooling to the extent of drawing away from and exposing the embedded articles.

According to the present invention, potting compositions are provided that are free from undesirable shrinkage and have a flow point appreciably higher and a viscosity appreciably lower than compositions heretofore in use. The compositions of this invention have the further distinctive property of a gradual increase in the flow point when subjected to prolonged heating and are therefore peculiarly advantageous for potting fixed electrical condensers, etc., closely associated with heat-generating electrical elements.

The compositions comprising this invention are obtained from mixtures of a halogenated polycyclic hydrocarbon, such as chlorinated naphthalene having a waxy consistency, a bituminous substance such as gilsonite, and a natural wax, such as Montan wax. A waxlike halogenated naphthalene is too brittle when used alone, and while the addition of a bitumen is found to give a marked improvement in this respect, the mixture of these two ingredients alone is not acceptable as a potting composition on account of the shrinkage that is manifested. The inclusion of a natural wax is found to be a corrective for shrinkage, and resulting mixtures furthermore are obtainable having flow points of about 80 to 100° C. and viscosities of 100 at 120° C. and even as low as 50 at higher temperatures by the Stormer method.

As a bitumen, gilsonite is preferred, for when added to a molten halogenated naphthalene it is readily dissolved and apparently some reaction occurs that progresses with continued heating, for there is a gradual increase in the flow point of the composition as the heating is prolonged; however, other bitumens including grahamite, amorphous blown hydrocarbon oils, blown asphalts, etc., may be substituted in whole or in part. Montan wax is preferred as the natural wax addition on account of its high melting point and the properties obtained with its use; other waxes, such as ceresin, ozokerite, carnauba wax, are also found to lessen shrinkage. In place of, or as a partial substitute for a naphthalene product other wax-like halogenated products of poly-cyclic hydrocarbons, such as anthracene, etc., may be used.

A typical formula for preparing a potting composition according to this invention comprises about 39 per cent of a chlorinated naphthalene, consisting mainly of a tetra-chloro-naphthalene, about 27 per cent of gilsonite and about 34 per cent of Montan wax. The gilsonite is added to the melted chlorinated naphthalene and stirred in and thereupon the wax is included and the liquid mass stirred until homogeneous. The mass is then poured into pans and allowed to cool and solidify. For use in potting, the composition is melted and poured about the articles to be embedded. A composition prepared in accordance with this formula showed a flow point of about 100° C. and a viscosity at 130° C. of about 50 increasing to about 100 at 120° C. Other satisfactory potting compositions have been obtained with 25 to 40 per cent of chlorinated naphthalenes containing mostly tri- or tetra-chloro-naphthalenes, 20 to 30 per cent of gilsonite and 30 to 50 per cent of Montan wax.

I claim:

1. A potting composition comprising about 39 per cent of a chlorinated naphthalene, containing principally a tetrachloronaphthalene, about 27 per cent of gilsonite and about 34 per cent of Montan wax.

2. A potting composition comprising about 25 to 40 per cent of a wax-like chlorinated naphthalene, 20 to 30 per cent of gilsonite and 30 to 50 per cent of Montan wax.

3. A wax-like potting composition comprising a wax-like halogenated polycyclic hydrocarbon, a bitumen and an organic wax having a melting point between 60 and 93° C., the polycyclic hydrocarbon being present in an amount from about 25 to 40 parts, the bitumen being present in an amount from about 20 to 30 parts and the other ingredients being proportioned to provide substantially no shrinkage.

4. A wax-like potting composition comprising a wax-like halogenated polycyclic hydrocarbon, a bitumen and an organic wax having a melting point between 60 and 93° C., the halogenated polycyclic hydrocarbon being present in an amount from about 25 to 40 parts, the wax being present in an amount from about 30 to 50 parts and the other ingredients being proportioned to provide substantially no shrinkage.

5. A wax-like potting composition comprising a wax-like halogenated polycyclic hydrocarbon, a bitumen and an organic wax, the organic wax being present in an amount from about 30 to 50 parts, the bitumen being present in an amount from about 20 to 30 parts and the other ingredients being proportioned to provide substantially no shrinkage.

MYRON E. DELANEY.